US012725729B2

(12) United States Patent
Yoon et al.

(10) Patent No.: US 12,725,729 B2
(45) Date of Patent: Sep. 1, 2026

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Boum Seock Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 916 days.

(21) Appl. No.: 18/091,562

(22) Filed: Dec. 30, 2022

(65) Prior Publication Data

US 2023/0360840 A1 Nov. 9, 2023

(30) Foreign Application Priority Data

May 4, 2022 (KR) ........................ 10-2022-0055596

(51) Int. Cl.
*H01F 27/29* (2006.01)
*H01F 27/02* (2006.01)
(Continued)

(52) U.S. Cl.
CPC ........... *H01F 27/292* (2013.01); *H01F 27/02* (2013.01); *H01F 27/24* (2013.01); *H01F 27/2852* (2013.01)

(58) Field of Classification Search
CPC ........ H01F 27/292; H01F 27/02; H01F 27/24; H01F 27/2852
See application file for complete search history.

(56) References Cited

U.S. PATENT DOCUMENTS

2018/0350499 A1* 12/2018 Matsuura ............... H01G 4/232
2020/0211767 A1* 7/2020 Hou ....................... H01F 27/255
(Continued)

FOREIGN PATENT DOCUMENTS

JP 2017147321 A * 8/2017 ............... H01F 3/10
KR 102217291 B1 * 2/2021 ........... H01F 27/006
(Continued)

*Primary Examiner* — Malcolm Barnes
(74) *Attorney, Agent, or Firm* — Morgan, Lewis & Bockius LLP

(57) ABSTRACT

A coil component includes a body including first to sixth surfaces, a first coil portion disposed in the body, and including a first winding portion and first and second extension portions, a second coil portion disposed in the body, and including a second winding portion, and third and fourth extension portions, first and second external electrodes disposed on the body and respectively connected to the first and second extension portions, and third and fourth external electrodes disposed on the body and respectively connected to the third and fourth extension portions. The first and third extension portions include first and third lead-out portions extending from the first surface, respectively, and the second and fourth extension portions include second and fourth lead-out portions extending from the second surface, respectively. The first and second lead-out portions are shifted from each other, and the third and fourth lead-out portions are shifted from each other.

21 Claims, 9 Drawing Sheets

(51) Int. Cl.
*H01F 27/24* (2006.01)
*H01F 27/28* (2006.01)

(56) References Cited

U.S. PATENT DOCUMENTS

2021/0225578 A1 7/2021 Jung et al.
2021/0398737 A1 12/2021 Lee et al.
2022/0037083 A1* 2/2022 Arai .................... H01F 17/0013
2022/0044857 A1* 2/2022 Matsuura ................ H01F 27/29

FOREIGN PATENT DOCUMENTS

KR 102236100 B1 * 4/2021 ............. H01F 27/34
KR 10-2253471 B1 5/2021
KR 10-2021-0156571 A 12/2021

* cited by examiner

II-II'

I-I'

COIL COMPONENT

CROSS-REFERENCE TO RELATED APPLICATION(S)

This application claims benefit of priority to Korean Patent Application No. 10-2022-0055596 filed on May 4, 2022 in the Korean Intellectual Property Office, the disclosure of which is incorporated herein by reference in its entirety.

TECHNICAL FIELD

The present disclosure relates to a coil component.

BACKGROUND

With the miniaturization and thinning of electronic devices such as digital TVs, mobile phones, and notebook computers, there is need for the miniaturization and thinning of coil components applied to such electronic devices, and in order to meet this need, the research and development of various winding-type or thin film-type coil components may be actively progressing.

A major issue with the miniaturization and thinning of coil components is to realize the same characteristics as those of existing coil components, despite the miniaturization and thinning thereof. In order to satisfy these needs, a ratio of a magnetic material in a core in which the magnetic material may be charged should be increased, but there may be a limit to increasing the ratio due to changes in frequency characteristics according to strength and insulation of a body of an inductor.

Meanwhile, recently, demand for an array-type coil component having an advantage of reducing a mounting area of the coil component is increasing. The array-type coil component may be a non-coupled inductor type, a coupled inductor type, or a mixture of the above types, according to a coupling coefficient or mutual inductance between a plurality of coil portions.

SUMMARY

An aspect of the present disclosure is to realize a coil component that may have high performance and may reduce short circuit defects when mounted on a substrate or the like.

According to an aspect of the present disclosure, a coil component includes a body including first and second surfaces perpendicular to a first direction while opposing each other, and third and fourth surfaces connected to the first and second surfaces and perpendicular to a second direction while opposing each other, a first coil portion disposed in the body, and including a first winding portion and first and second extension portions respectively connected to one end and the other end of the first winding portion, a second coil portion disposed in the body, and including a second winding portion and third and fourth extension portions respectively connected to one end and the other end of the second winding portion, the first and second winding portions disposed in the second direction, first and second external electrodes disposed on the body and respectively connected to the first and second extension portions, and third and fourth external electrodes disposed on the body and respectively connected to the third and fourth extension portions. The first and third extension portions include first and third lead-out portions extending from the first surface, respectively, and the second and fourth extension portions include second and fourth lead-out portions extending from the second surface, respectively, wherein the first and second lead-out portions are shifted from each other in the second direction, and the third and fourth lead-out portions are shifted from each other in the second direction.

In an embodiment, the first and third external electrodes may extend from the first surface to the second surface, and the second and fourth external electrodes may extend from the second surface to the first surface.

In an embodiment, the first to fourth external electrodes may have a band shape.

In an embodiment, the first to fourth external electrodes may be sequentially arranged in the second direction.

In an embodiment, a distance between the first and second external electrodes may be shorter than a distance between the second and third external electrodes.

In an embodiment, the body may further include fifth and sixth surfaces connected to the first to fourth surfaces and perpendicular to a third direction while opposing each other, and the first to third directions may be perpendicular to each other.

In an embodiment, winding axes of the first and second winding portions may be parallel to the third direction.

In an embodiment, an interval between the first and second surfaces of the body may be greater than an interval between the fifth and sixth surfaces of the body.

In an embodiment, an interval between the third and fourth surfaces of the body may be greater than the interval between the fifth and sixth surfaces of the body.

In an embodiment, the first extension portion may include a region wound along an external side surface of the second winding portion.

In an embodiment, the region of the first extension portion wound along the external side surface of the second winding portion may be disposed between the second winding portion and the third extension portion.

In an embodiment, the third extension portion may include a region wound along an external side surface of the first winding portion.

In an embodiment, the region of the third extension portion wound along the external side surface of the first winding portion may be disposed between the first winding portion and the first extension portion.

According to another aspect of the present disclosure, a coil component includes a body including first and second surfaces perpendicular to a first direction while opposing each other, and third and fourth surfaces connected to the first and second surfaces and perpendicular to a second direction while opposing each other, a first coil portion disposed in the body, and including a first winding portion and first and second extension portions respectively connected to one end and the other end of the first winding portion, a second coil portion disposed in the body, and including a second winding portion disposed and third and fourth extension portions respectively connected to one end and the other end of the second winding portion, the first and second winding portions disposed in the second direction, first and second external electrodes disposed on the body and respectively connected to the first and second extension portions, and third and fourth external electrodes disposed on the body and respectively connected to the third and fourth extension portions, wherein the first to fourth external electrodes have a band shape.

In an embodiment, the first to fourth external electrodes may be sequentially arranged in the second direction.

In an embodiment, a distance between the first and second external electrodes may be shorter than a distance between the second and third external electrodes.

According to another aspect of the present disclosure, a coil component includes a body including first and second surfaces opposing each other in a first direction, and third and fourth surfaces connected to the first and second surfaces and opposing each other in a second direction; a first coil portion disposed in the body, and including a first winding portion and first and second extension portions respectively connected to one end and the other end of the first winding portion; a second coil portion disposed in the body, and including a second winding portion and third and fourth extension portions respectively connected to one end and the other end of the second winding portion, the first and second winding portions disposed in the second direction; first and second external electrodes disposed on the body and respectively connected to the first and second extension portions; and third and fourth external electrodes disposed on the body and respectively connected to the third and fourth extension portions. The first to fourth external electrodes are disposed at least on one of the first and second surfaces and are spaced apart from each other in the second direction.

In an embodiment, the first and third extension portions may include first and third lead-out portions extending from the first surface to be connected to the first and third external electrodes, respectively, and the second and fourth extension portions may include second and fourth lead-out portions extending from the second surface to be connected to the second and fourth external electrodes, respectively.

In an embodiment, the first to fourth external electrodes may extend between the first surface and the second surface.

In an embodiment, the first to fourth external electrodes may be sequentially arranged in the second direction.

In an embodiment, a distance between the first and second external electrodes may be shorter than a distance between the second and third external electrodes.

In an embodiment, the first coil portion and the second coil portion may be substantially perpendicular to the one of the first and second surfaces.

BRIEF DESCRIPTION OF DRAWINGS

The above and other aspects, features, and advantages of the present disclosure will be more clearly understood from the following detailed description, taken in conjunction with the accompanying drawings.

FIGS. 4 and 5 are plan views of a first coil portion, viewed from above, and correspond to an upper coil portion and a lower coil portion with respect to a support member, respectively.

DETAILED DESCRIPTION

Figure 1:
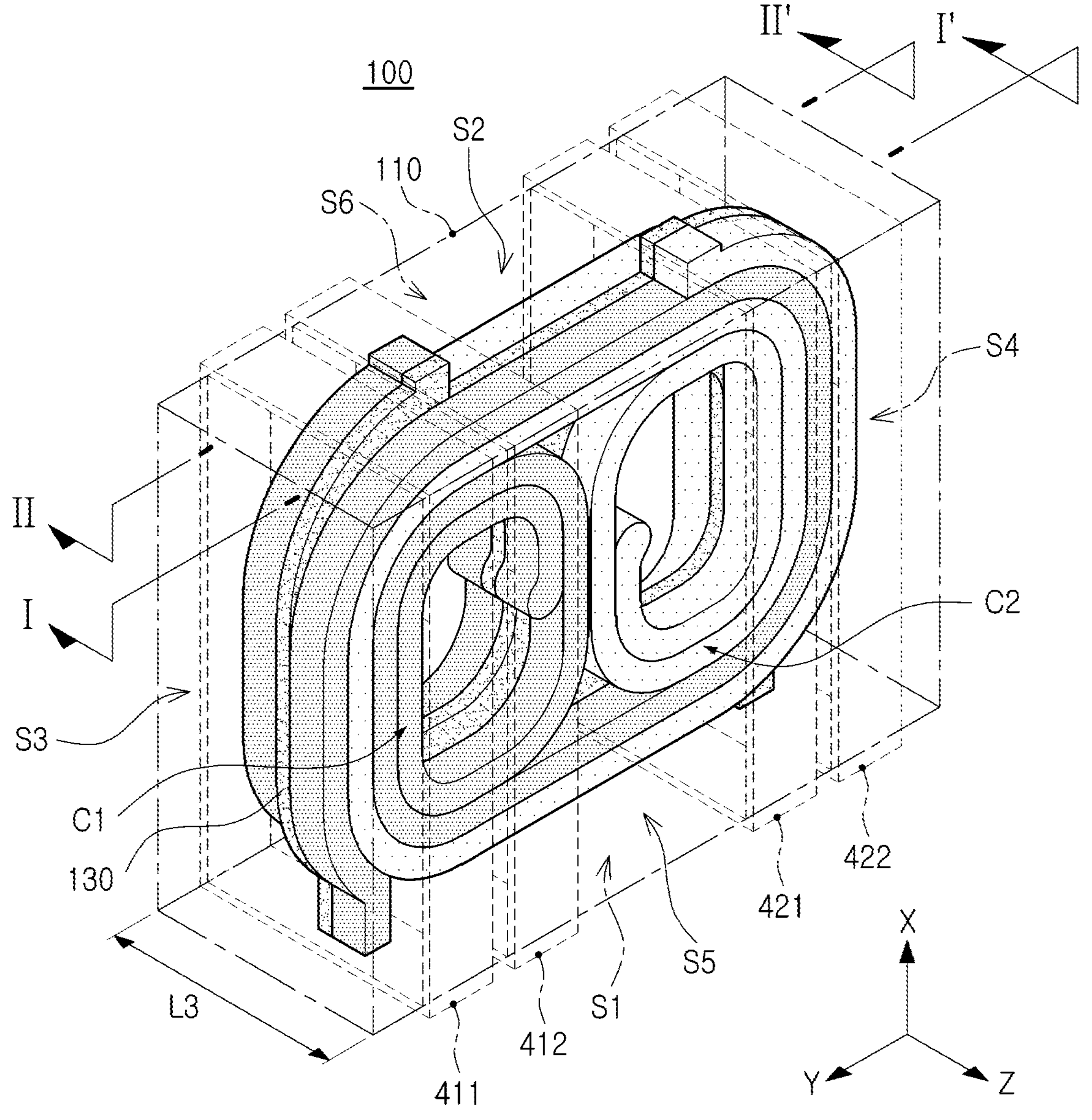
FIG. 1 is a transparent perspective view schematically illustrating a coil component of an embodiment of the present disclosure.

Hereinafter, embodiments of the present disclosure will be described with reference to specific embodiments and the accompanying drawings. Embodiments of the present disclosure may be modified in various other forms, and the scope of the present disclosure is not limited to embodiments described below. Further, embodiments of the present disclosure may be provided in order to more completely explain the present disclosure to those skilled in the art. Accordingly, shapes and sizes of components in the drawings may be exaggerated for clearer description, and components indicated by the same reference numerals in the drawings may be the same elements.

Figure 2:
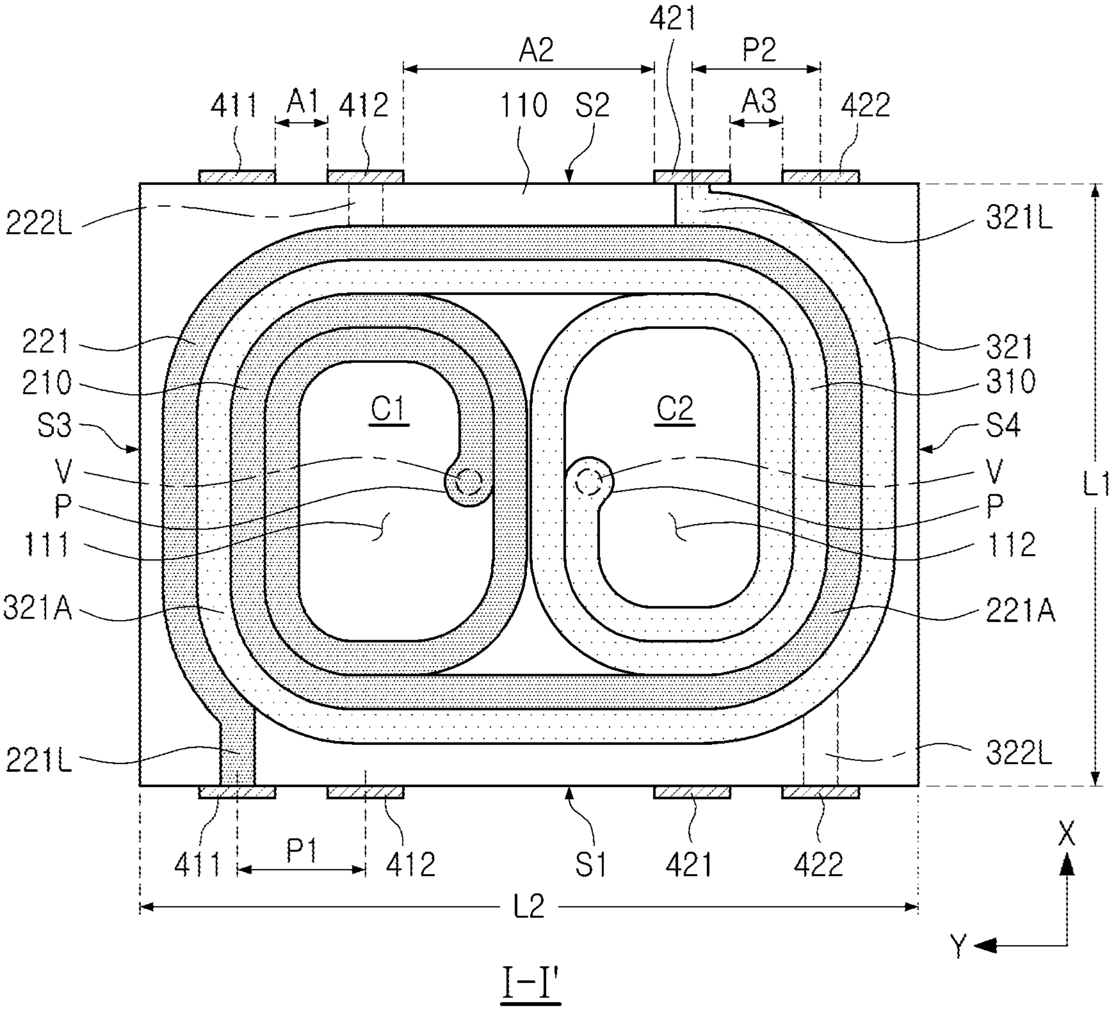
FIGS. 2 and 3 correspond to cross-sectional views of one region of the coil component of FIG. 1.
Figure 3:
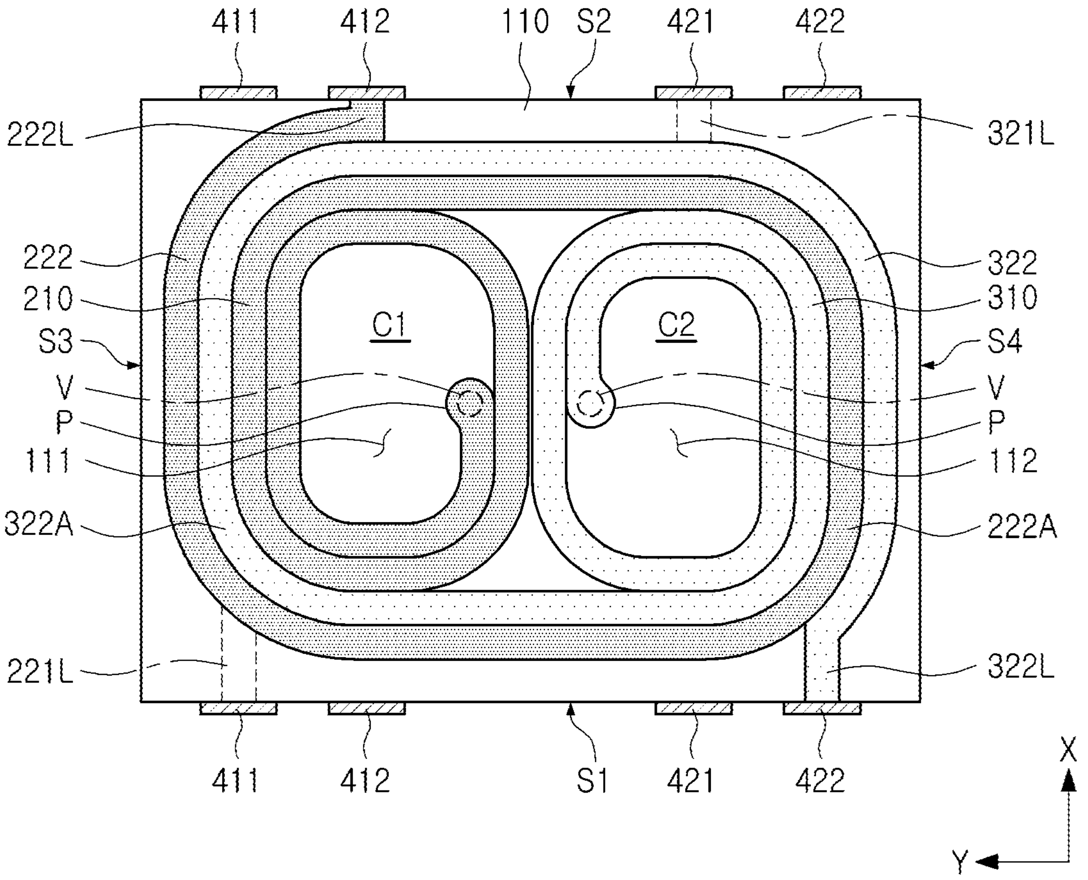
Figure 4:
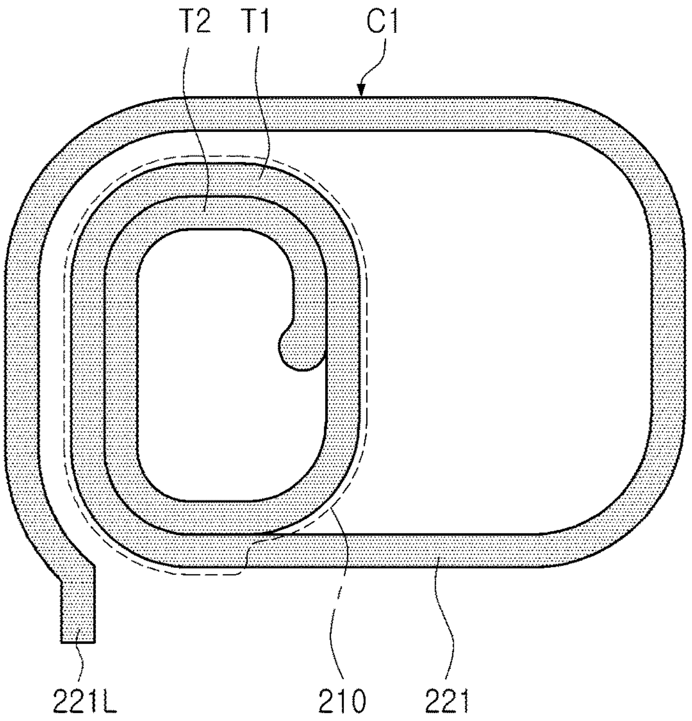
FIGS. 4 and 5 illustrate an example of a first coil portion.
Figure 5:
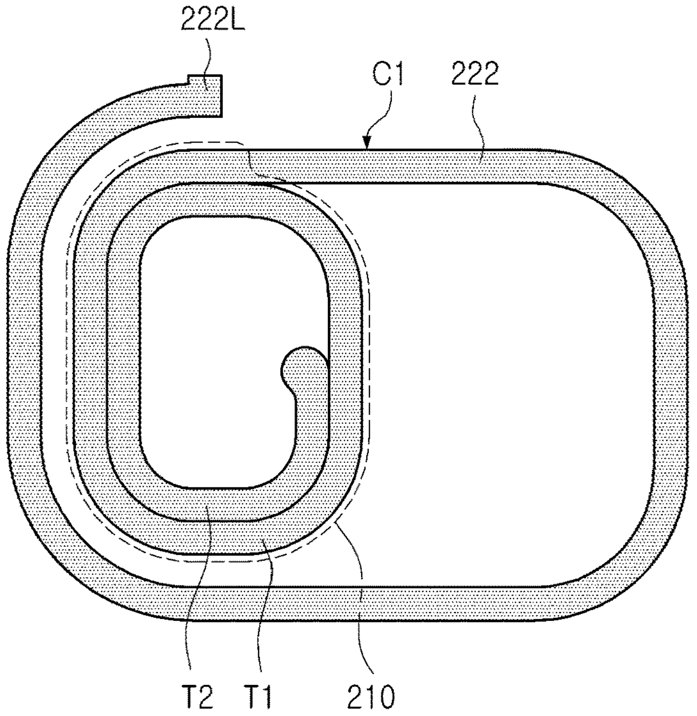

FIG. 1 is a transparent perspective view schematically illustrating a coil component of an embodiment of the present disclosure. FIGS. 2 and 3 correspond to cross-sectional views of one region of the coil component of FIG. 1. FIGS. 4 and 5 illustrate an example of a first coil portion. Referring to FIGS. 1 to 3, a coil component 100 according to the present embodiment may include a body 110, a first coil portion C1, a second coil portion C2, and external electrodes 411, 412, 421, and 422, and an inductor array form may be implemented by a plurality of coil portions C1 and C2. In this case, first and second lead-out portions 221L and 222L of the first coil portion C1 and third and fourth lead-out portions 321L and 322L of the second coil portion C2 may be shifted in one direction. Hereinafter, main elements constituting the coil component 100 of the present embodiment will be described.

In the body 110, the first and second coil portions C1 and C2 may be disposed therein, and an overall appearance of the coil component 100 may be achieved. The body 110 may include a first surface S1 and a second surface S2, disposed perpendicularly to a first direction (an X-direction) while facing each other. The body 110 may include a third surface S3 and a fourth surface S4, and the third surface S3 and the fourth surface S4 may face each other in a second direction (a Y-direction) while connecting the first surface S1 and the second surface S2. In this case, the second direction (the Y-direction) may be perpendicular to the first direction (the X-direction). In addition, the body 110 may further include a fifth surface S5 and a sixth surface S6, connected to the first to fourth surfaces S1 to S4 and disposed perpendicularly to a third direction (a Z-direction) while facing each other, and in this case, the first to third directions (the X-direction, the Y-direction, and the Z-direction) may be perpendicular to each other. With respect to a size condition of the body 110, an interval L1 between the first surface S1 and the second surface S2 may be longer than an interval L3 between the fifth surface S5 and the sixth surface S6. In addition, an interval L2 between the third surface S3 and the fourth surface S4 of the body 110 may be longer than the interval L3 between the fifth surface S5 and the sixth surface S6. As will be described later, this size condition of the body 110 may be suitable for disposing the coil component 100 on a substrate or the like such that the first surface S1 is a mounting surface. The interval L1 between the first surface S1 and the second surface S2 may correspond to an interval measured in the first direction (the X-direction), but the first surface S1 and the second surface S2 may not be completely parallel. Therefore, in this case, L1 may be defined as a minimum interval between the first surface S1 and the second surface S2. The same criteria may be applied to L2 and L3.

The body 110 may include an insulating resin and a magnetic material. Specifically, the body 110 may be formed by laminating one or more magnetic composite sheets in which a magnetic material is dispersed in an insulating resin. The magnetic material may be a ferrite powder particle or a metal magnetic powder particle. Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites. The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder. The metal magnetic powder particle may be amorphous or crystalline. For example, the metal magnetic powder particle may be a Fe—Si—B—Cr-based amorphous alloy powder particle, but is not limited thereto. The ferrite powder particle and the metal magnetic powder particle may have an average diameter of about 0.1 μm to 30 μm, respectively, but are not limited thereto. The body 110 may include two or more types of magnetic materials dispersed in the resin. In this case, the term "different types of magnetic materials" means that magnetic materials dispersed in a resin are distinguishable from each other by at least one of an average diameter, a composition, a crystallinity, or a shape. The insulating resin may include an epoxy, a polyimide, a liquid crystal polymer, or the like, in a single form or in combined form, but is not limited thereto.

In relation to an example of the manufacturing method, the body 110 may be formed by a lamination method. Specifically, a plurality of unit stacks for manufacturing the body 110 may be prepared and stacked on upper and lower portions of the first and second coil portions C1 and C2. In this case, the unit stacks may be prepared in sheet types by mixing a magnetic particle such as a metal or the like, and an organic material such as a thermosetting resin, a binder, a solvent, or the like, to form a slurry, applying the slurry to a carrier film by a doctor blade method, by a thickness of several tens of μm, and drying the same. Therefore, the unit stacks may be manufactured in a form in which the magnetic particle is dispersed in the thermosetting resin such as an epoxy resin, polyimide, or the like.

The first coil portion C1 may be disposed in the body 110, and may have a first winding portion 210, and first and second extension portions 221 and 222 respectively connected to one end and the other end of the first winding portion 210. In this case, the first extension portion 221 may include a first lead-out portion 221L exposed from the first surface S1, and may be connected to a first external electrode 411 through the first lead-out portion 221L. The second extension 222 may include a second lead-out portion 222L exposed from the second surface S2, and may be connected to a second external electrode 412 through the second lead-out portion 222L. The first winding portion 210 may form at least one turn. In this case, a winding axis of the first winding portion 210 may be disposed in the body 110, to be parallel to the third direction (the Z-direction).

The one end and the other end of the first winding portion 210 may be defined to include a region forming a substantial turn. Specifically, as illustrated in FIGS. 4 and 5, an outermost turn T1 of the first winding portion 210 may be maintained at a substantially constant interval from an inner turn T2 adjacent thereto, the first winding portion 210 may be defined up to a region in which the constant interval is maintained, and the first extension portion 221 or the second extension portion 222 may be defined from a region in which an interval between the outermost turn T1 and the inner turn T2 increases. Being "substantial" may include not only the case in which a corresponding element or elements are in an ideal state or have an ideal relation without using "substantial", but also the case in which a process error, recognized by one of ordinary sill in the art, may cause the corresponding element or elements not to be in the ideal state or not to have the ideal relation. The first coil portion C1 may be disposed on both first and second surfaces facing each other of a support member 130, and a portion disposed on the first surface is illustrated in FIG. 2, and a portion disposed on the second surface is illustrated in FIG. 3.

As illustrated in FIGS. 2 and 3, the first extension portion 221 may include a region 221A wound along an external side surface of a second winding portion 310, and therefrom, the first and second coil portions C1 and C2 may be more closely coupled. In this case, the region 221A wound along the external side surface of the second winding portion 310 in the first extension portion 221 may be disposed between the second winding portion 310 and the third extension portion 321. Similarly, the second extension portion 222 may include a region 222A wound along an external side surface of the second winding portion 310, and in this case, the region 222A wound along the external side surface of the second winding portion 310 in the second extension portion 222 may be disposed between the second wound portion 310 and the fourth extension portion 322. In the first winding portion 210, to connect portions disposed on the first and second surfaces of the support member 130 to each other, the first coil portion C1 may include a pad region P, and the pad region P may be connected to a conductive via V passing through the support member 130. The first coil portion C1 may be a plating pattern formed using a plating process used in the art, for example, pattern plating, anisotropic plating, isotropic plating, or the like, and a plurality of processes among these processes may be used to form a multilayer structure.

The second coil portion C2 may be disposed in the body 110, and may have a second winding portion 310, and third and fourth extension portions 321 and 322 respectively connected to one end and the other end of the second winding portion 310. In this case, the third extension portion 321 may include a third lead-out portion 321L exposed from the first surface S1, and may be connected to a third external electrode 421 through the third lead-out portion 321L. The fourth extension portion 322 may include a fourth lead-out portion 322L exposed from the second surface S2, and may be connected to a fourth external electrode 422 through the fourth lead-out portion 322L. The second winding portion 310 may be adjacent to the first winding portion 210 in the second direction (the Y-direction) in the body 110, and may form at least one turn. In this case, a winding axis of the second winding portion 310 may be disposed in the body 110, to be parallel to the third direction (the Z-direction). Like the first winding portion 210, the one end and the other end of the second winding portion 310 may be defined to include a region forming a substantial turn. The definitions of the first winding portion 210 and the first and second extension portions 221 and 222, described in the first coil portion C1 may also be applied to the second coil portion C2. For example, an outermost turn of the second winding portion 310 may be maintained at a substantially constant interval from an inner turn adjacent thereto, and the second winding portion 310 may be defined up to a region in which the constant interval is maintained, and the third extension portion 321 or the fourth extension portion 322 may be defined from a region in which an interval between the outermost turn and the inner turn increases. In addition, like the first coil portion C1, the second coil portion C2 may be disposed on both the first and second surfaces of the support member 130, and a portion formed on the first surface is illustrated in FIG. 2, and a portion formed on the second surface is illustrated in FIG. 3.

As illustrated in FIGS. 2 and 3, the third extension portion 321 may include a region 321A wound along an external side surface of the first winding portion 210, and from this, the first and second coil portions C1 and C2 may be more closely coupled. In this case, the region 321A wound along the external side surface of the first winding portion 210 in the third extension portion 321 may be disposed between the first winding portion 210 and the first extension portion 221. Similarly, the fourth extension portion 322 may include a region 322A wound along an external side surface of the first wound portion 210, and in this case, the region 322A wound along the external side surface of the first wound portion 210 in the fourth extension portion 322 may be disposed between the first winding portion 210 and the second extension portion 222. In the second winding portion 310, to connect portions disposed on the first and second surfaces of the support member 130 to each other, the second coil portion C2 may include a pad region P, and the pad region P may be connected to a conductive via V passing through the support member 130. The first coil portion C1 may be a plating pattern formed using a plating process used in the art, for example, pattern plating, anisotropic plating, isotropic plating, or the like, and a plurality of processes among these processes may be used to have a multilayer structure.

Examples of materials constituting the first and second coil portions C1 and C2 may be a conductive material such as copper (Cu), aluminum (Al), silver (Ag), tin (Sn), gold (Au), nickel (Ni), lead (Pb), titanium (Ti), chromium (Cr), or an alloy thereof, but the present disclosure is not limited thereto. In addition, although the present embodiment illustrates a structure in which two coil portions C1 and C2 are disposed in the body 110, other coil portions may be additionally disposed, in addition to the first and second coil portions C1 and C2, to form an inductor array as a whole.

Figure 6:
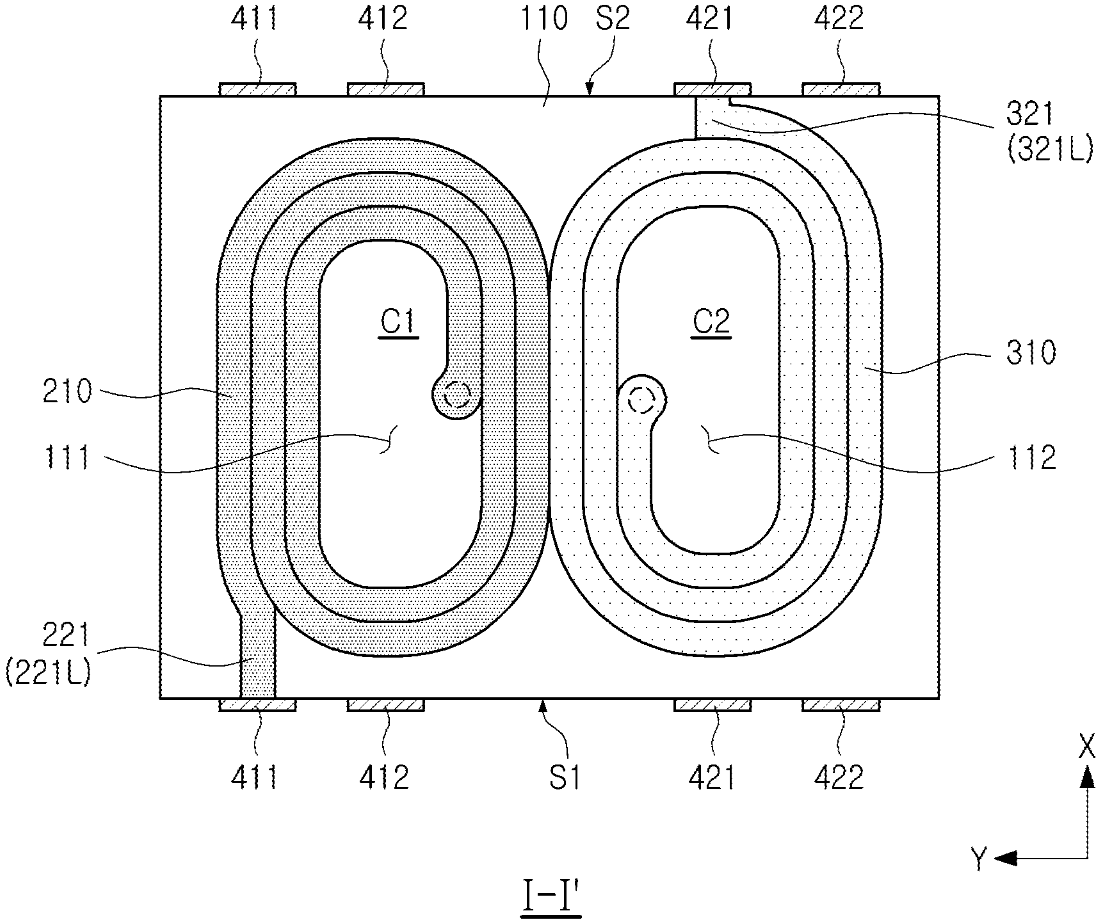
FIGS. 6 to 10 illustrate coil components according to modified examples.
Figure 7:
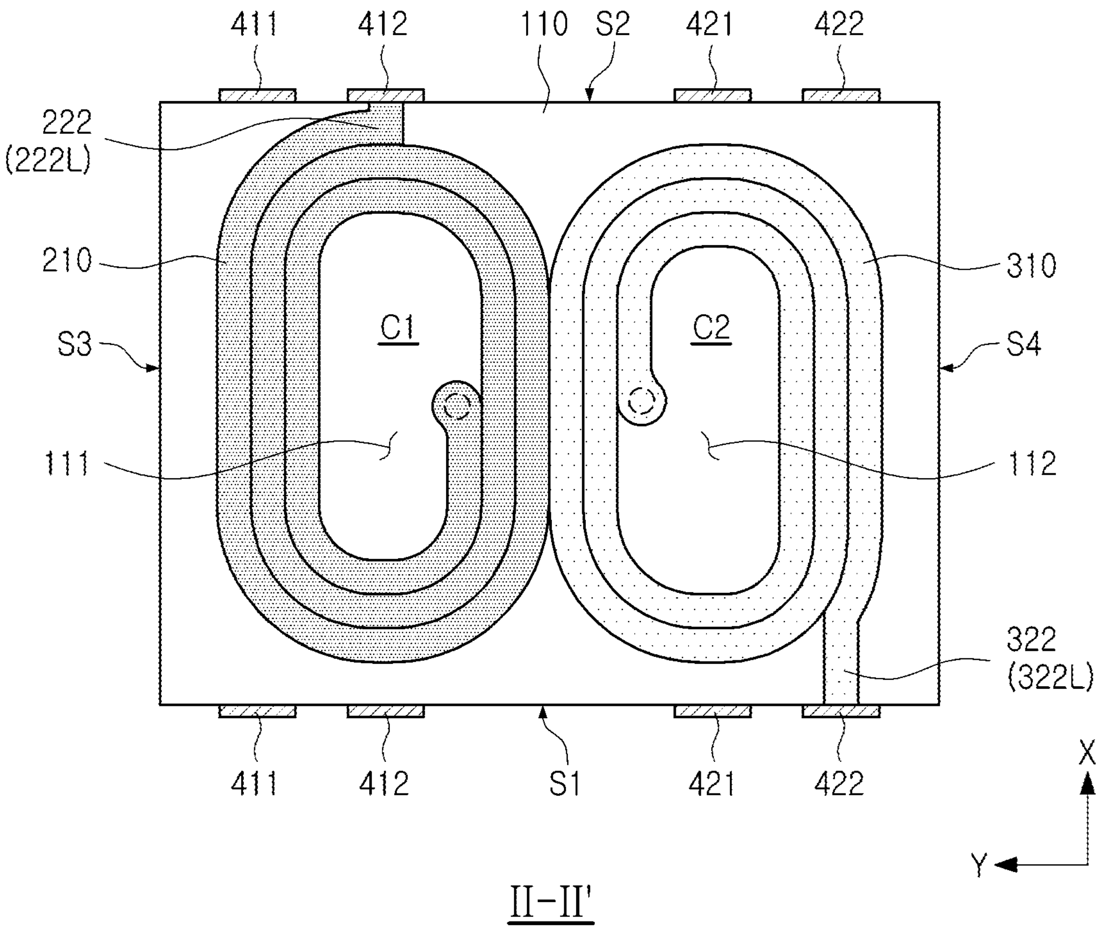

In the present embodiment, the first extension portion 221 may include the region 221A wound along the external side surface of the second winding portion 310, and the remaining extension portions 222, 321, and 322 have similar structures. As necessary for adjusting a coupling coefficient of the first and second coil portions C1 and C2, as in modified examples of FIGS. 6 and 7, such a wound region of the extension portion may not be present. In the modified examples of FIGS. 6 and 7, the first extension portion 221 and the second extension portion 222 may be disposed only on the first coil portion C1, and the third extension portion 321 and the fourth extension portion 322 may be disposed only on the second coil portion C2. As the first and second coil portions C1 and C2 have such an arrangement, their respective inductance may increase while reducing their influence on each other.

The support member 130 may support the first and second coil portions C1 and C2, and may be formed of, for example, a polypropylene glycol (PPG) substrate, a ferrite substrate, a metal-based soft magnetic substrate, or the like. According to an embodiment, the support member 130 may not be provided. For example, when a coil having a winding structure is used, the support member 130 may not be separately required. As illustrated, a portion of the support member 130 may be penetrated to form a through-hole, and a material constituting the body 110 may be filled in the through-hole. Therefore, a first core portion 111 may be formed in the first coil portion C1, and a second core portion 112 may be formed in the second coil portion C2.

The first and second external electrodes 411 and 412 may be disposed on the body 110, and may be respectively connected to the first extension portion 221 and the second extension portion 222 of the first coil portion C1. As illustrated, the first external electrode 411 may extend from the first surface S1 to the second surface S2, and the second external electrode 412 may extend from the second surface S2 to the first surface S1. This means that the first external electrode 411 is connected to the first lead-out portion 221L, and extends from the first surface S1 to the second surface S2, opposite thereto, and the second external electrode 412 is connected to the second lead-out portion 222L, and extends from the second surface S2 to the first surface S1, opposite thereto. As an example of this type, the first and second external electrodes 411 and 412 may have a band shape.

The third and fourth external electrodes 421 and 422 may be disposed on the body 110, and may be respectively connected to the third extension portion 321 and the fourth extension portion 322 of the second coil portion C2. As illustrated, the third external electrode 421 may extend from the first surface S1 to the second surface S2, and the fourth external electrode 422 may extend from the second surface S2 to the first surface S1. This means that the third external electrode 421 is connected to the third lead-out portion 321L, and extends from the first surface S1 to the second surface S2, opposite thereto, and the fourth external electrode 422 is connected to the fourth lead-out portion 322L, and extends from the second surface S2 to the first surface S1, opposite thereto. As an example of this type, the third and fourth external electrodes 421 and 422 may have a band shape.

The first to fourth external electrodes 411, 412, 421, and 422 may be formed using a paste containing a metal having high electrical conductivity, and the paste may be, for example, a conductive paste including nickel (Ni), copper (Cu), tin (Sn), silver (Ag), or the like alone, or an alloy thereof or the like. In addition, a plating layer may be provided to cover each of the first to fourth external electrodes 411, 412, 421, and 422. In this case, the plating layer may include any one or more selected from the group consisting of nickel (Ni), copper (Cu), and tin (Sn), and, for example, a nickel (Ni) layer and a tin (Sn) layer may be formed therein sequentially.

As described above, the first and second lead-out portions 221L and 222L may be shifted to each other in the second direction (the Y-direction), and the third and fourth lead-out portions 321L and 322L may be shifted to each other in the second direction (the Y-direction). In this case, the shift of the first and second lead-out portions 221L and 222L in the second direction (the Y-direction) to each other may be defined to have a form spaced apart such that they have a predetermined pitch P1 in the second direction (the Y-direction), based on the cross-sectional view of FIG. 2. Similarly, in this case, the shift of the third and fourth lead-out portions 321L and 322L in the second direction (the Y-direction) to each other may be defined to have a form spaced apart such that they have a predetermined pitch P2 in the second direction (the Y-direction), based on the cross-sectional view of FIG. 2. According to this arrangement method of the first to fourth lead-out portions 221L, 222L, 321L, and 322L, the first to fourth external electrodes 411, 412, 421, and 422 may be sequentially arranged in the second direction (the Y-direction). In this case, an interval A1 between the first and second external electrodes 411 and 412 may be shorter than an interval A2 between the second and third external electrodes 412 and 421. Also, an interval A3 between the third and fourth external electrodes 421 and 422 may be shorter than the interval A2 between the second and third external electrodes 412 and 421.

The coil component 100 having the above-described structure may be suitable for arranging a winding direction (the Z-direction) of the coil portions C1 and C2 to be parallel to a mounting surface, when mounted on a substrate or the like. In this case, the mounting surface may be the first surface S1 of the body 110. In this mounting method, areas of the core portions 111 and 112 may be sufficiently secured, and it is advantageous to increase a degree of freedom in design for a margin from an outer side of the coil component 100 to the coil portions C1 and C2, to implement high performance, for example, high inductance, Q value, and low resistance. Furthermore, when the coil component 100 is mounted such that the first surface S1 faces the substrate, as the first to fourth external electrodes 411, 412, 421, and 422 are sequentially arranged in the second direction (the Y-direction), short-circuit defect may be effectively reduced, and reliability of the coil component 100 may be improved therefrom.

Figure 8:
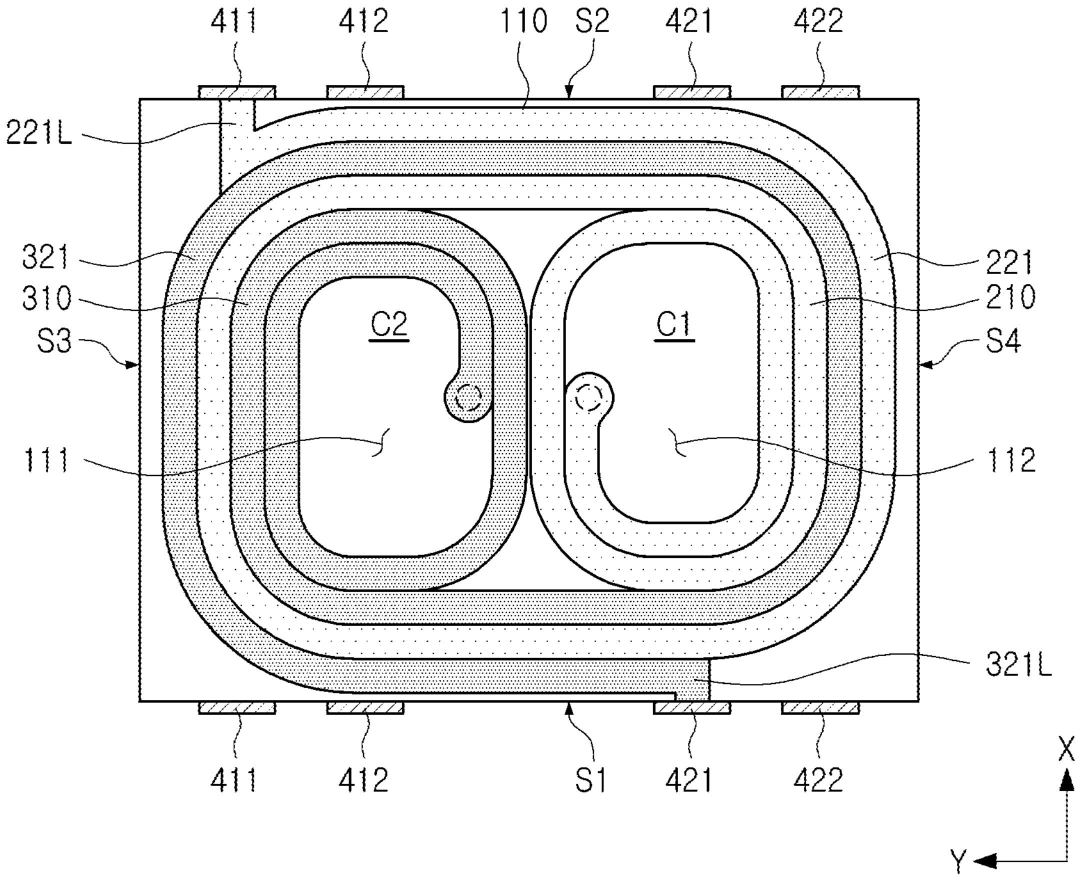
Figure 9:
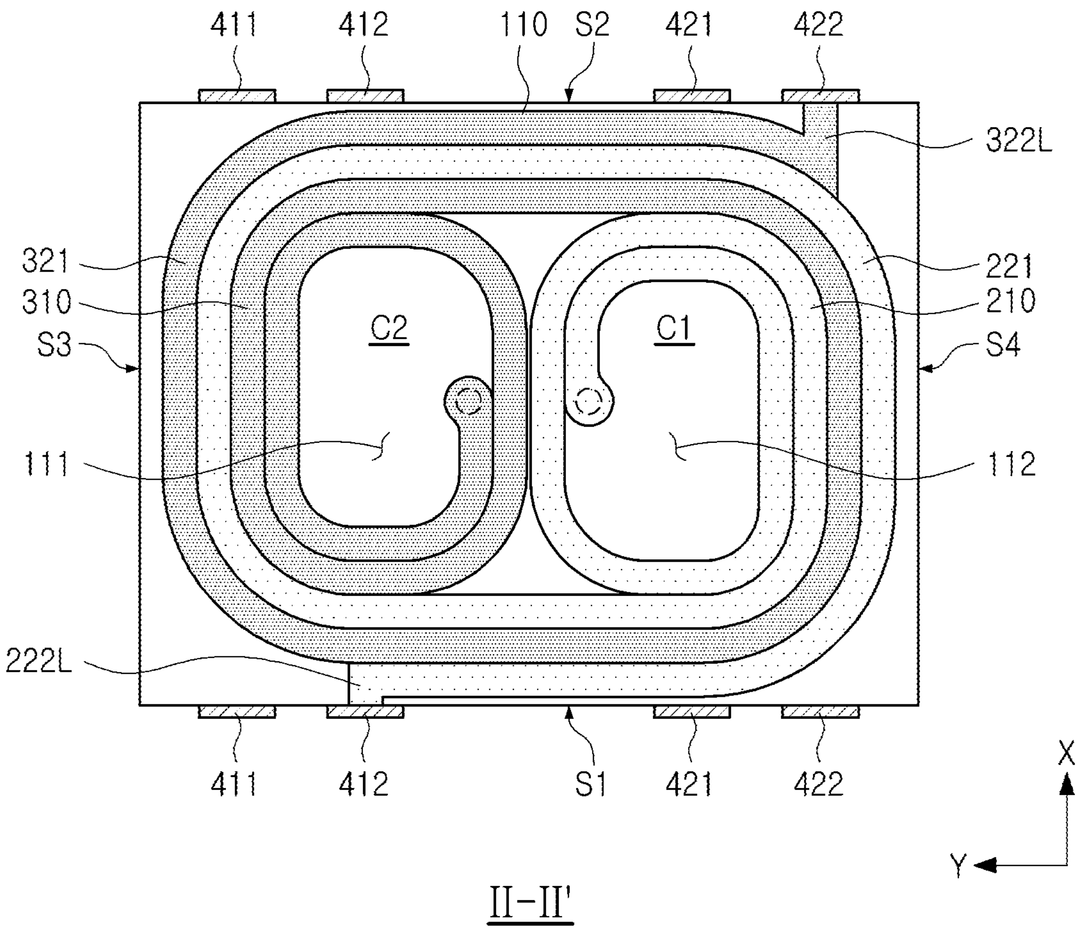

In the above-described embodiment, a direction from the first coil portion C1 toward the second coil portion C2 and a direction in which the first to fourth external electrodes 411, 412, 421, and 422 are arranged may be the same, but may be opposite to each other. The modified examples of FIGS. 8 and 9 illustrate this, and the first and second coil portions C1 and C2 may be disposed at positions opposite to those of the previous embodiment. Therefore, the direction from the first coil portion C1 toward the second coil portion C2 (a leftward direction based on the drawings) and the direction in which the first to fourth external electrodes 411, 412, 421, and 422 are arranged (a rightward direction based on the drawings) may be opposite to each other, and in this case, lengths of the first to fourth extension portions 221, 222, 321, and 322 may increase, compared to the previous embodiment.

Figure 10:
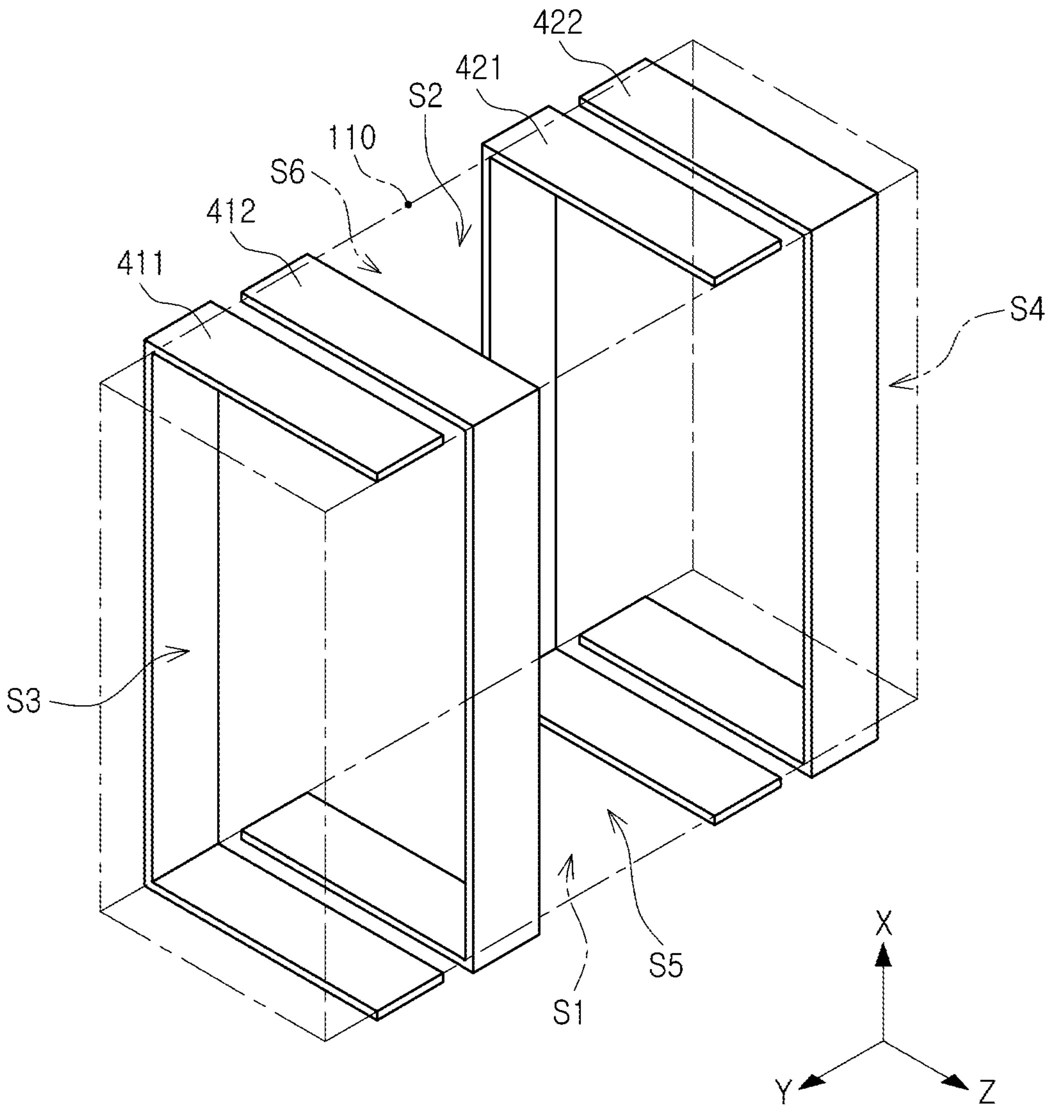

The modified example of FIG. 10 may be different from the previous embodiment in view of shapes of the external electrodes 411, 412, 421, and 422. In this modified example, an internal configuration of the body 110 may be employed in the same manner as in the previous embodiment, and a detailed description thereof will be omitted. As illustrated in FIG. 10, the first external electrode 411 may extend from the first surface S1 toward the second surface S2, may not be formed on the fifth surface S5, and portions formed on the first surface S1 and the second surface S2 may be connected to each other by a portion formed on the sixth surface S6. Similarly, the third external electrode 421 may extend from the first surface S1 toward the second surface S2, may not be formed on the fifth surface S5, and portions formed on the first surface S1 and the second surface S2 may be connected to each other by a portion formed on the sixth surface S6. In addition, the second and fourth external electrodes 411 and 421 may extend from the first surface S1 toward the second surface S2, may not be formed on the fifth surface S5, and portions formed on the first surface S1 and the second surface S2 may be connected to each other by a portion formed on the sixth surface S6.

As an effect of the present disclosure, characteristics and reliability of a coil component may be improved.

While example embodiments have been illustrated and described above, it will be apparent to those skilled in the art that modifications and variations could be made without departing from the scope of the present disclosure as defined by the appended claims.

What is claimed is:

1. A coil component comprising:

a body including first and second surfaces perpendicular to a first direction while opposing each other, and third and fourth surfaces connected to the first and second surfaces and perpendicular to a second direction while opposing each other;

a first coil portion disposed in the body, and including a first winding portion and first and second extension portions respectively connected to one end and the other end of the first winding portion;

a second coil portion disposed in the body, and including a second winding portion and third and fourth extension portions respectively connected to one end and the other end of the second winding portion, the first and second winding portions disposed in the second direction;

first and second external electrodes disposed on the body and respectively connected to the first and second extension portions; and third and fourth external electrodes disposed on the body and respectively connected to the third and fourth extension portions, wherein the first and fourth extension portions include first and fourth lead-out portions extending from the first surface, respectively, and the second and third extension portions include second and third lead-out portions extending from the second surface, respectively, wherein the first and second lead-out portions are shifted from each other in the second direction, and the third and fourth lead-out portions are shifted from each other in the second direction.

2. The coil component of claim 1, wherein the first and third external electrodes extend from the first surface to the second surface, and the second and fourth external electrodes extend from the second surface to the first surface.

3. The coil component of claim 2, wherein the first to fourth external electrodes have a band shape.

4. The coil component of claim 2, wherein the first to fourth external electrodes are sequentially arranged in the second direction.

5. The coil component of claim 4, wherein a distance between the first and second external electrodes is shorter than a distance between the second and third external electrodes.

6. The coil component of claim 1, wherein the body further comprises fifth and sixth surfaces connected to the first to fourth surfaces and perpendicular to a third direction while opposing each other, wherein the first to third directions are perpendicular to each other.

7. The coil component of claim 6, wherein winding axes of the first and second winding portions are parallel to the third direction.

8. The coil component of claim 6, wherein an interval between the first and second surfaces of the body is greater than an interval between the fifth and sixth surfaces of the body.

9. The coil component of claim 8, wherein an interval between the third and fourth surfaces of the body is greater than the interval between the fifth and sixth surfaces of the body.

10. The coil component of claim 1, wherein the first extension portion comprises a region wound along an external side surface of the second winding portion.

11. The coil component of claim 10, wherein the region of the first extension portion wound along the external side surface of the second winding portion is disposed between the second winding portion and the third extension portion.

12. The coil component of claim 1, wherein the third extension portion comprises a region wound along an external side surface of the first winding portion.

13. The coil component of claim 12, wherein the region of the third extension portion wound along the external side surface of the first winding portion is disposed between the first winding portion and the first extension portion.

14. A coil component comprising:

a body including first and second surfaces perpendicular to a first direction while opposing each other, third and fourth surfaces connected to the first and second surfaces and perpendicular to a second direction while opposing each other, and fifth and sixth surfaces opposing each other and connected to the first to fourth surfaces;

a first coil portion disposed in the body, and including a first winding portion and first and second extension portions respectively connected to one end and the other end of the first winding portion;

a second coil portion disposed in the body, and including a second winding portion disposed, and third and fourth extension portions respectively connected to one end and the other end of the second winding portion, the first and second winding portions disposed in the second direction;

first and second external electrodes disposed on the body and respectively connected to the first and second extension portions; and third and fourth external electrodes disposed on the body and respectively connected to the third and fourth extension portions, wherein the first to fourth external electrodes have a band shape and in the band shape, first and second portions, respectively disposed on the fifth and sixth surfaces of the body, of a corresponding one of the first to fourth external electrodes, are connected to each other through third and fourth portions, respectively disposed on the first and second surfaces of the body, of the corresponding one of the first to fourth external electrodes.

15. The coil component of claim 14, wherein the first to fourth external electrodes are sequentially arranged in the second direction.

16. The coil component of claim 15, wherein a distance between the first and second external electrodes is shorter than a distance between the second and third external electrodes.

17. A coil component comprising:

a body including first and second surfaces opposing each other in a first direction, and third and fourth surfaces connected to the first and second surfaces and opposing each other in a second direction;

a first coil portion disposed in the body, and including a first winding portion and first and second extension portions respectively connected to one end and the other end of the first winding portion;

a second coil portion disposed in the body, and including a second winding portion and third and fourth extension portions respectively connected to one end and the other end of the second winding portion, the first and second winding portions disposed in the second direction;

first and second external electrodes disposed on the body and respectively connected to the first and second extension portions; and third and fourth external electrodes disposed on the body and respectively connected to the third and fourth extension portions, wherein the first to fourth external electrodes are disposed at least on one of the first and second surfaces and are spaced apart from each other in the second direction, and the first to fourth external electrodes are sequentially arranged in the second direction.

18. The coil component of claim 17, wherein the first and fourth extension portions include first and fourth lead-out portions extending from the first surface to be connected to the first and fourth external electrodes, respectively, and the second and third extension portions include second and third lead-out portions extending from the second surface to be connected to the second and third external electrodes, respectively.

19. The coil component of claim 17, wherein the first to fourth external electrodes extend between the first surface and the second surface.

20. The coil component of claim 17, wherein a distance between the first and second external electrodes is shorter than a distance between the second and third external electrodes.

21. The coil component of claim 17, wherein the first coil portion and the second coil portion are substantially perpendicular to the one of the first and second surfaces.

* * * * *